(12) United States Patent
Shi et al.

(10) Patent No.: US 10,798,766 B2
(45) Date of Patent: Oct. 6, 2020

(54) MULTI-CONNECTIVITY COMMUNICATION METHOD AND DEVICE

(71) Applicant: HUAWEI TECHNOLOGIES CO., LTD., Shenzhen, Guangdong (CN)

(72) Inventors: Xiaoli Shi, Shanghai (CN); Hongzhuo Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/226,223

(22) Filed: Dec. 19, 2018

(65) Prior Publication Data

US 2019/0124708 A1  Apr. 25, 2019

Related U.S. Application Data

(63) Continuation of application No. PCT/CN2016/087061, filed on Jun. 24, 2016.

(51) Int. Cl.
| | | |
|---|---|---|
| *H04W 88/06* | (2009.01) | |
| *H04W 76/15* | (2018.01) | |
| *H04W 76/27* | (2018.01) | |
| *H04W 24/10* | (2009.01) | |
| *H04W 88/10* | (2009.01) | |
| *H04W 80/02* | (2009.01) | |

(Continued)

(52) U.S. Cl.
CPC .......... *H04W 76/15* (2018.02); *H04W 24/10* (2013.01); *H04W 76/27* (2018.02); *H04W 88/06* (2013.01); *H04W 88/10* (2013.01); *H04W 80/02* (2013.01); *H04W 80/08* (2013.01); *H04W 92/20* (2013.01)

(58) Field of Classification Search
CPC combination set(s) only.
See application file for complete search history.

(56) References Cited

U.S. PATENT DOCUMENTS

| | | | |
|---|---|---|---|
| 2014/0192740 A1 | 7/2014 | Ekpenyong et al. | |
| 2016/0088542 A1* | 3/2016 | Belghoul ......... | H04W 28/0268 370/331 |

(Continued)

FOREIGN PATENT DOCUMENTS

| | | |
|---|---|---|
| CN | 104349467 A | 2/2015 |
| CN | 104812003 A | 7/2015 |

(Continued)

OTHER PUBLICATIONS

3GPP138, May 2016, (Huawei: "Requirements and functionalities of the interface between LTE and NR",3GPP Draft; R3-161138).*

(Continued)

*Primary Examiner* — Lakeram Jangbahadur
(74) *Attorney, Agent, or Firm* — Fish & Richardson P.C.

(57) ABSTRACT

Embodiments of the present disclosure provide a multi-connectivity communication method and a device. An access network device of an LTE network sets up a second connection for UE and splits data of the UE through the second connection. The second connection is a connection set up between the UE and the access network device of the LTE network through an access network device of a next generation network. Therefore, dual connectivity between the UE and the LTE network and the next generation network is implemented, a data transmission rate of the UE is increased, and a throughput of the entire network can be increased.

14 Claims, 9 Drawing Sheets

(51) Int. Cl.
*H04W 80/08* (2009.01)
*H04W 92/20* (2009.01)

(56) References Cited

U.S. PATENT DOCUMENTS

| | | | |
|---|---|---|---|
| 2016/0219475 A1* | 7/2016 | Kim | H04L 5/00 |
| 2016/0316508 A1 | 10/2016 | Hong et al. | |
| 2016/0366616 A1 | 12/2016 | Wen et al. | |
| 2017/0006603 A1 | 1/2017 | Chen et al. | |
| 2017/0202033 A1* | 7/2017 | Lee | H04W 36/08 |
| 2018/0160336 A1* | 6/2018 | Dai | H04W 36/28 |
| 2018/0279403 A1 | 9/2018 | Kim | |
| 2018/0338319 A1 | 11/2018 | Kim et al. | |

FOREIGN PATENT DOCUMENTS

| | | |
|---|---|---|
| CN | 104918329 A | 9/2015 |
| CN | 105027664 A | 11/2015 |
| CN | 105451342 A | 3/2016 |
| CN | 105519167 A | 4/2016 |
| CN | 105684491 A | 6/2016 |
| EP | 3316625 A1 | 5/2018 |
| JP | 2016058796 A | 4/2016 |
| WO | 2015015298 A2 | 2/2015 |
| WO | 2016021949 A1 | 2/2016 |
| WO | 2016029962 A1 | 3/2016 |

OTHER PUBLICATIONS

International Search Report and Written Opinion issued in International Application No. PCT/CN2016/087061 dated Mar. 1, 2017, 19 pages.

R3-161138—Huawei, "Requirements and functionalities of the interface between LTE and NR," 3GPP TSG-RAN3 Meeting #92, 3GPPDraft; Nanjing, China; May 23-27, 2016, XP051105942, 5 pages.

Extended European Search Report issued in European Application No. 16905896.3 dated May 21, 2019, 11 pages.

Office Action issued in Chinese Application No. 201680086563.4 dated Feb. 28, 2020, 28 pages (with English translation).

* cited by examiner

MULTI-CONNECTIVITY COMMUNICATION METHOD AND DEVICE

CROSS-REFERENCE TO RELATED APPLICATIONS

This application is a continuation of International Application No. PCT/CN2016/087061, filed on Jun. 24, 2016, the disclosure of which is hereby incorporated by reference in its entirety.

TECHNICAL FIELD

Embodiments of the present disclosure relate to communications technologies, and in particular, to a multi-connectivity communication method and a device.

BACKGROUND

Dual connectivity (DC for short) means that user equipment (UE for short) simultaneously accesses two access network devices, and the two access network devices simultaneously provide services for the UE. For example, the UE simultaneously receives data from two base stations that are not co-sited and sends data to the two base stations that are not co-sited based on the dual connectivity. Through the dual connectivity, load balancing between base stations and load balancing on a downlink and an uplink can be implemented, frequent handover can be avoided, and core network overloading caused by frequent handover can be avoided.

In the prior art, the dual connectivity is applicable to a Long Term Evolution (LTE for short) system. For example, UE establishes two connections to both a macro base station and a micro base station in an LTE system, or the UE establishes two connections to both a base station in LTE and an endpoint network element in a wireless local area network (WLAN for short).

With rapid development of user requirements and technologies, a next generation network is approaching. The next generation network is capable of providing a higher transmission rate. The theoretically highest transmission rate of the next generation network may reach tens of gigabytes (Gb for short) per second, which is hundreds of times faster than a transmission rate of an LTE system. How to establish two connections to access network devices of an LTE network and the next generation network becomes a problem that needs to be resolved urgently.

SUMMARY

Embodiments of the present disclosure provide a multi-connectivity communication method and a device, to implement dual connectivity between UE and an LTE network and a next generation network, increase a data transmission rate of the UE, and increase a throughput of the entire network.

A first aspect of the present disclosure provides a multi-connectivity communication method, including: determining, by an access network device of an LTE network, an access network device group for UE, setting up a second connection for the UE, and splitting data of the UE through the second connection. The access network device group includes at least two access network devices of a next generation network, the second connection is a connection set up between the UE and the access network device of the LTE network through a first access network device in the access network device group, and there is also a first connection between the access network device of the LTE network and the UE.

Optionally, the access network device of the LTE network sets up the second connection for the UE in the following manner:

separately sending, by the access network device of the LTE network, a dual connectivity adding request to each access network device in the access network device group, where the dual connectivity adding request is used to request to add the second connection for the UE;

separately receiving, by the access network device of the LTE network, a dual connectivity adding response sent by each access network device, where the dual connectivity adding response sent by each access network device includes configuration information of the access network device;

sending, by the access network device of the LTE network, the configuration information of each access network device to the UE; and receiving, by the access network device of the LTE network, a configuration complete message sent by the UE, and determining, based on the configuration complete message, that the second connection is successfully set up.

Optionally, after the setting up, by the access network device of the LTE network, a second connection for the UE, the method further includes: receiving, by the access network device of the LTE network, a connection hang-up indication sent by the UE, and stopping sending downlink data to the first access network device according to the connection hang-up indication; and receiving a connection change indication sent by the UE, and switching the second connection from the first access network device to a second access network device in the access network device group according to the connection change indication.

Optionally, the determining, by an access network device of an LTE network, an access network device group for UE is specifically: receiving, by the access network device of the LTE network, a candidate access network device group sent by the UE, where the candidate access network device group includes at least two candidate access network devices of the next generation network that are determined by the UE; and determining, by the access network device of the LTE network, the access network device group based on the candidate access network device group.

A second aspect of the present disclosure provides a multi-connectivity communication method, including: receiving, by UE, configuration information that is of access network devices in an access network device group and that is sent by an access network device of an LTE network, where the access network device group includes at least two access network devices of a next generation network; and completing, by the UE, splitting configuration based on configuration information of a first access network device in the access network device group, accessing the first access network device in the access network device group, and sending a configuration complete message to the access network device of the LTE network after accessing the first access network device, where the configuration complete message is used to notify the access network device of the LTE network that a second connection is successfully set up, and the second connection is a connection set up between the UE and the access network device of the LTE network through the first access network device.

Optionally, after the second connection is set up, the method further includes:

determining, by the UE, to switch the second connection from the first access network device to a second access network device in the access network device group;

sending, by the UE, a connection hang-up indication to the access network device of the LTE network, where the connection hang-up indication is used to instruct the access network device of the LTE network to stop sending downlink data to the first access network device;

accessing, by the UE, the second access network device based on configuration information of the second access network device; and sending, by the UE, a connection change indication to the access network device of the LTE network, where the connection change indication is used to instruct the access network device of the LTE network to switch the second connection from the first access network device to the second access network device.

Optionally, before the receiving, by UE, configuration information that is of access network devices in an access network device group and that is sent by an access network device of an LTE network, the method further includes: sending, by the UE, a candidate access network device group to the access network device of the LTE network, so that the access network device of the LTE network determines the access network device group for the UE according to the candidate access network device group, and the candidate access network device group includes at least two candidate access network devices of the next generation network that are determined by the UE.

A third aspect of the present disclosure provides a multi-connectivity communication method, including: receiving, by an access network device of an LTE network, a first dual connectivity adding request sent by UE, setting up a second connection for the UE based on the first dual connectivity adding request, and splitting data of the UE through the second connection. There is a first connection between the access network device of the LTE network and the UE, and the second connection is a connection set up between the UE and the access network device of the LTE network through a first access network device of a next generation network.

Optionally, the access network device of the LTE network sets up the second connection for the UE in the following manner:

sending, by the access network device of the LTE network, a second dual connectivity adding request to the first access network device based on the first dual connectivity adding request, where the second dual connectivity adding request is used to request the first access network device to allow the access network device of the LTE network to add the second connection for the UE;

receiving, by the access network device of the LTE network, a second dual connectivity adding response sent by the first access network device, where the second dual connectivity adding response includes configuration information of the first access network device;

sending, by the access network device of the LTE network, the configuration information of the first access network device to the UE;

receiving, by the access network device of the LTE network, a first configuration complete message sent by the UE; and determining, by the access network device of the LTE network based on the first configuration complete message, that the second connection is successfully set up.

Optionally, after the second connection is successfully set up, the method further includes: receiving, by the access network device of the LTE network, a connection hang-up indication sent by the UE, and stopping sending downlink data to the first access network device according to the connection hang-up indication; and receiving a connection change indication sent by the UE, and switching the second connection from the first access network device to a second access network device of the next generation network according to the connection change indication.

Optionally, the switching, by the access network device of the LTE network, the second connection from the first access network device to the second access network device according to the connection change indication is specifically:

sending, by the access network device of the LTE network, a third dual connectivity adding request to the second access network device according to the connection change indication, where the third dual connectivity adding request is used to request the second access network device to allow the access network device of the LTE network to add the second connection for the UE;

receiving, by the access network device of the LTE network, a third dual connectivity adding response sent by the second access network device based on the third dual connectivity adding request, where the third dual connectivity adding response includes configuration information of the second access network device;

sending, by the access network device of the LTE network, the configuration information of the second access network device to the UE; and receiving, by the access network device of the LTE network, the second configuration complete message sent by the UE, and determining, based on the second configuration complete message, that the second connection is successfully changed.

A fourth aspect of the present disclosure provides a multi-connectivity communication method, including:

sending, by UE, a first dual connectivity adding request to an access network device of an LTE network, where the first dual connectivity adding request is used to request the access network device of the LTE network to add a second connection for the UE, the second connection is a connection set up between the UE and the access network device of the LTE network through a first access network device of a next generation network, and there is a first connection between the UE and the access network device of the LTE network;

receiving, by the UE, configuration information of the first access network device sent by the access network device of the LTE network;

performing, by the UE, splitting configuration based on the configuration information of the first access network device; and sending, by the UE, the first configuration complete message to the access network device of the LTE network, where the first configuration complete message is used to notify the access network device of the LTE network that the second connection is successfully set up.

Optionally, after the sending, by the UE, the first configuration complete message to the access network device of the LTE network, the method further includes:

determining, by the UE, to switch the second connection from the first access network device to a second access network device of the next generation network;

sending, by the UE, a connection hang-up indication to the access network device of the LTE network, where the connection hang-up indication is used to instruct the access network device of the LTE network to stop sending downlink data to the first access network device;

accessing, by the UE, the second access network device;

sending, by the UE, a connection change indication to the access network device of the LTE network, where the connection change indication is used to instruct the access network device of the LTE network to switch the second connection from the first access network device to the second access network device;

receiving, by the UE, configuration information of the second access network device sent by the access network device of the LTE network;

performing, by the UE, splitting configuration based on the configuration information of the second access network device; and sending, by the UE, the second configuration complete message to the access network device of the LTE network, where the second configuration complete message is used to notify the access network device of the LTE network that the second connection is successfully changed.

A fifth aspect of the present disclosure provides an access network device of an LTE network, including a processor and a memory, where the memory is configured to store a program, and the processor is configured to run the program to perform the following steps: determining an access network device group for UE, setting up a second connection for the UE, and splitting data of the UE through the second connection. The access network device group includes at least two access network devices of a next generation network, the second connection is a connection set up between the UE and the access network device of the LTE network through a first access network device in the access network device group, and there is a first connection between the access network device of the LTE network and the UE.

Optionally, the access network device of the LTE network further includes a first transmitter, a first receiver, a second transmitter, and a second receiver, and the processor is specifically configured to:

separately send a dual connectivity adding request to each access network device in the access network device group by using the second transmitter, where the dual connectivity adding request is used to request to add the second connection for the UE;

separately receive, by using the second receiver, a dual connectivity adding response sent by each access network device, where the dual connectivity adding response sent by each access network device includes configuration information of the access network device;

send, by using the first transmitter, the configuration information of each access network device to the UE;

receive, by using the first receiver, a configuration complete message sent by the UE; and determine, based on the configuration complete message, that the second connection is successfully set up.

Optionally, the second receiver is further configured to receive a connection hang-up indication sent by the UE, the processor is further configured to stop sending downlink data to the first access network device according to the connection hang-up indication, the receiver is further configured to receive a connection change indication sent by the UE, and the processor is further configured to switch the second connection from the first access network device to a second access network device in the access network device group according to the connection change indication.

Optionally, the processor determines the access network device group in the following manner: receiving, by using the second receiver, a candidate access network device group sent by the UE, and determining the access network device group based on the candidate access network device group, where the candidate access network device group includes at least two candidate access network devices of the next generation network that are determined by the UE.

A sixth aspect of the present disclosure provides UE, including:

a receiver, configured to receive configuration information that is of access network devices in an access network device group and that is sent by an access network device of a Long Term Evolution LTE network, where the access network device group includes at least two access network devices of a next generation network;

a processor, configured to access a first access network device in the access network device group based on configuration information of the first access network device in the access network device group; and a transmitter, configured to send a configuration complete message to the access network device of the LTE network, where the configuration complete message is used to notify the access network device of the LTE network that a second connection is successfully set up, and the second connection is a connection set up between the UE and the access network device of the LTE network through the first access network device.

Optionally, the processor is further configured to determine to switch the second connection from the first access network device to a second access network device in the access network device group; and correspondingly, the transmitter is further configured to send a connection hang-up indication to the access network device of the LTE network, and the connection hang-up indication is used to instruct the access network device of the LTE network to stop sending downlink data to the first access network device; the processor is further configured to access the second access network device based on configuration information of the second access network device; and the transmitter is further configured to send a connection change indication to the access network device of the LTE network, where the connection change indication is used to instruct the access network device of the LTE network to switch the second connection from the first access network device to the second access network device.

Optionally, the transmitter is further configured to send a candidate access network device group to the access network device of the LTE network, so that the access network device of the LTE network determines the access network device group based on the candidate access network device group, where the candidate access network device group includes at least two candidate access network devices of the next generation network that are determined by the UE.

A seventh aspect of the present disclosure provides an access network device of an LTE network, including:

a first receiver, configured to receive a first dual connectivity adding request sent by UE, where there is a first connection between the access network device of the LTE network and the UE, the first dual connectivity adding request is used to request the access network device of the LTE network to add a second connection for the UE, and the second connection is a connection set up between the UE and the access network device of the LTE network through a first access network device of a next generation network; and a processor, configured to set up the second connection for the UE based on the first dual connectivity adding request, where the processor is further configured to split data of the UE through the second connection.

Optionally, the device further includes: a first transmitter, a second transmitter, and a second receiver, and the processor is specifically configured to set up the second connection in the following manner:

sending a second dual connectivity adding request to the first access network device based on the first dual connectivity adding request by using the first transmitter, where the second dual connectivity adding request is used to request the first access network device to allow the access network device of the LTE network to add the second connection for the UE;

receiving, by using the first receiver, a second dual connectivity adding response sent by the first access network device, where the second dual connectivity adding response includes configuration information of the first access network device;

sending the configuration information of the first access network device to the UE by using the second transmitter;

receiving, by using the second receiver, a first configuration complete message sent by the UE; and determining, based on the first configuration complete message, that the second connection is successfully set up.

Optionally, the second receiver is further configured to: receive a connection hang-up indication sent by the UE and receive a connection change indication sent by the UE; and correspondingly, the processor is further configured to: stop sending downlink data to the first access network device according to the connection hang-up indication, and switch the second connection from the first access network device to a second access network device of the next generation network according to the connection change indication.

Optionally, that the processor switches the second connection from the first access network device to a second access network device of the next generation network according to the connection change indication is specifically:

sending a third dual connectivity adding request to the second access network device according to the connection change indication by using the first transmitter, where the third dual connectivity adding request is used to request the second access network device to allow the access network device of the LTE network to add the second connection for the UE;

receiving, by using the first receiver, a third dual connectivity adding response sent by the second access network device based on the third dual connectivity adding request, where the third dual connectivity adding response includes configuration information of the second access network device;

sending the configuration information of the second access network device to the UE by using the second transmitter; and receiving, by using the second receiver, the second configuration complete message sent by the UE, and determine, based on the second configuration complete message, that the second connection is successfully changed.

An eighth aspect of the present disclosure provides UE, including:

a transmitter, configured to send a first dual connectivity adding request to an access network device of a Long Term Evolution LTE network, where there is a first connection between the UE and the access network device of the LTE network, the first dual connectivity adding request is used to request the access network device of the LTE network to add a second connection for the UE, and the second connection is a connection set up between the UE and the access network device of the LTE network through a first access network device of a next generation network;

a receiver, configured to receive configuration information of the first access network device sent by the access network device of the LTE network; and a processor, configured to perform splitting configuration based on the configuration information of the first access network device, where the transmitter is further configured to send the first configuration complete message to the access network device of the LTE network, where the first configuration complete message is used to notify the access network device of the LTE network that the second connection is successfully set up.

Optionally, the processor is further configured to determine to switch the second connection from the first access network device to a second access network device of the next generation network. Correspondingly, the transmitter is further configured to send a connection hang-up indication to the access network device of the LTE network, and the connection hang-up indication is used to instruct the access network device of the LTE network to stop sending downlink data to the first access network device; the processor is further configured to access the second access network device; the transmitter is further configured to send a connection change indication to the access network device of the LTE network, where the connection change indication is used to instruct the access network device of the LTE network to switch the second connection from the first access network device to the second access network device; the receiver is further configured to receive configuration information of the second access network device sent by the access network device of the LTE network; the processor is further configured to perform splitting configuration based on the configuration information of the second access network device; and the transmitter is further configured to send the second configuration complete message to the access network device of the LTE network, where the second configuration complete message is used to notify the access network device of the LTE network that the second connection is successfully changed.

In the first aspect, the second aspect, the fifth aspect, and the sixth aspect of the present disclosure, optionally, the dual connectivity adding request sent by the access network device of the LTE network to each access network device includes: the configuration information of the access network device; and correspondingly, the access network device of the LTE network generates the configuration information for each access network device before separately sending the dual connectivity adding request to each access network device in the access network device group.

In the first aspect, the second aspect, the fifth aspect, and the sixth aspect of the present disclosure, optionally, the dual connectivity adding request sent by the access network device of the LTE network to each access network device includes: configuration information of the access network device of the LTE network and a measurement report of each access network device, where the configuration information of the access network device is generated by a Radio Resource Control RRC layer of the access network device based on the configuration information of the access network device of the LTE network and the measurement report of the access network device.

In the third aspect, the fourth aspect, the seventh aspect, and the eighth aspect of the present disclosure, optionally, the second dual connectivity adding request includes the configuration information of the first access network device, and correspondingly, the access network device of the LTE network generates the configuration information of the first access network device before sending the second dual connectivity adding request to the first access network device based on the first dual connectivity adding request.

In the third aspect, the fourth aspect, the seventh aspect, and the eighth aspect of the present disclosure, optionally, the second dual connectivity adding request includes configuration information of the access network device of the LTE network and a measurement report of the first access network device, and the configuration information of the first access network device included in the second dual connectivity adding response is generated by a Radio Resource Control RRC layer of the first access network device based on the configuration information of the access network device of the LTE network and the measurement report of the first access network device.

A ninth aspect of the present disclosure provides an access network device of an LTE network. The access network device of the LTE network includes function modules configured to implement the method according to the first aspect of the present disclosure. For example, the access network device of the LTE network includes a first sending module, a first receiving module, a second sending module, a second receiving module, and a processing module. The first sending module is configured to send data to UE, the first receiving module is configured to receive data sent by the UE, the second sending module is configured to send data to an access network device of a next generation network, the second receiving module is configured to receive data sent by the access network device of the next generation network, and the processing module is configured to: communicate with the first sending module, the first receiving module, the second sending module, and the second receiving module and process data.

A tenth aspect of the present disclosure provides UE. The UE includes function modules configured to implement the method according to the second aspect of the present disclosure. For example, the UE includes a sending module, a receiving module, and a processing module. The sending module is configured to send data to an access network device of an LTE network and an access network device of a next generation network, the receiving module is configured to receive data sent by the access network device of the LTE network and the access network device of the next generation network, and the processing module is configured to: communicate with the sending module and the receiving module and process data.

An eleventh aspect of the present disclosure provides an access network device of an LTE network. The access network device of the LTE network includes function modules configured to implement the method according to the third aspect of the present disclosure. For example, the access network device of the LTE network includes a determining module, and a setup module, and a splitting module. The determining module is configured to determine an access network device group for UE, the setup module is configured to set up a second connection for the UE, where the second connection is a connection set up between the UE and the access network device of the LTE network through a first access network device in the access network device group, and the splitting module is configured to split data for the UE through the second connection. Optionally, the access network device of the LTE network further includes a first sending module, a first receiving module, a second sending module, and a second receiving module. The first sending module is configured to send data to UE, the first receiving module is configured to receive data sent by the UE, the second sending module is configured to send data to an access network device of a next generation network, and the second receiving module is configured to receive data sent by the access network device of the next generation network.

A twelfth aspect of the present disclosure provides UE. The UE includes function modules configured to implement the method according to the fourth aspect of the present disclosure. For example, the UE includes a sending module, a receiving module, and a processing module. The sending module is configured to send data to an access network device of an LTE network and an access network device of a next generation network, the receiving module is configured to receive data sent by the access network device of the LTE network and the access network device of the next generation network, and the processing module is configured to communicate with the sending module and the receiving module and process data.

According to the multi-connectivity communication method and the device provided in the embodiments of the present disclosure, the access network device of the LTE network sets up the second connection for the UE, and the data of the UE is split through the second connection, where the second connection is a connection set up between the UE and the access network device of the LTE network through the access network device of the next generation network. Therefore, dual connectivity between the UE and the LTE network and the next generation network is implemented, a data transmission rate of the UE is increased, and a throughput of the entire network can be increased.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

A multi-connectivity communication method provided in embodiments of the present disclosure is applied to a heterogeneous environment in which an LTE network and a next generation network coexist. The next generation network is also referred to as a fifth-generation mobile communication technology (the 5th Generation mobile communication technology, 5G for short) network or a new radio access network (New RAT or NR for short). The next generation network may have an independent core network, or may not have an independent core network. Air interface technologies used in the next generation network may be: a filter band multi-carrier (FBMC for short), faster than Nyquist (FTN for short), generalized frequency division multiplexing (GFDM for short), non-orthogonal multiple access (NOMA for short), and the like.

Multi-connectivity is also referred to as single signal multiple downlink (SSMD for short), which specifically means that UE accesses a core network of the LTE network through an access network device of an LTE network, control plane (CP for short) data is transmitted in the LTE network, and user plane (UP for short) data is transmitted on both an air interface of the LTE network and an air interface of a next generation network. Splitting anchors of the user plane data are at a Packet Data Convergence Protocol (PDCP) layer of the LTE network, that is, the access network device of the LTE network splits data of the UE at the PDCP layer by data packet or bearer.

Figure 1:
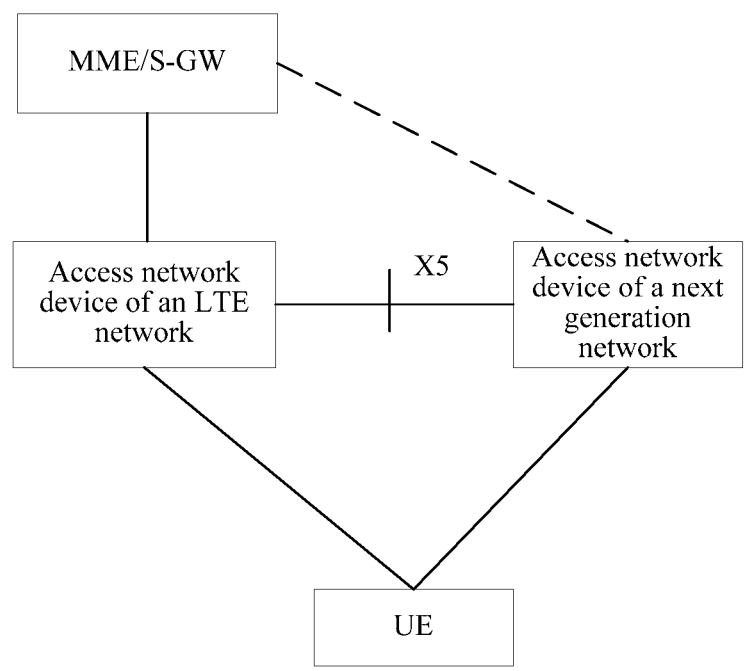
FIG. 1 is a schematic diagram of a network architecture applicable to an embodiment of the present disclosure.

FIG. 1 is a schematic diagram of a network architecture applicable to an embodiment of the present disclosure. As shown in FIG. 1, the network architecture shown in FIG. 1 includes an access network device of an LTE network, an access network device of a next generation network, and a core network device of the LTE network. The core network device of the LTE network includes a mobility management entity (Mobility Management Entity, MME for short) or a serving gateway (S-GW for short). The access network device of the next generation network and the access network device of the LTE network have similar functions and can both provide functions such as access security authentication, charging, and mobility management for the UE. In the example shown in FIG. 1, the UE accesses a core network of the LTE network through the access network device of the LTE network. The following describes a connection directly set up between the UE and the access network device of the LTE network as a first connection. In a multi-connectivity scenario, the UE is connected to the access network device of the LTE network through the access network device of the next generation network. An interface between the access network device of the LTE network and the access network device of the next generation network is a new interface. The new interface may be referred to as an X5 interface. The connection set up between the UE and the access network device of the LTE network through the access network device of the next generation network is referred to as a second connection below. In the example shown in FIG. 1, there are only two connections, and certainly, the UE may set up more connections through the access network device of the next generation network. In the network structure shown in FIG. 1, the next generation network has no core network, and the LTE network and the next generation network share the core network of the LTE network.

In the network architecture shown in FIG. 1, the access network device of the LTE network and the access network device of the next generation network may be or may not be co-sited. Coverage of the access network device of the LTE network and coverage of the access network device of the next generation network may overlap, or coverage of the access network device of the LTE network totally falls within coverage of the access network device of the next generation network, or coverage of the access network device of the next generation network totally falls within coverage of the access network device of the LTE network.

It should be noted that in the following embodiments, the access network device of the LTE network is also referred to as an evolved NodeB (eNB for short), and the access network device of the LTE network includes a macro base station and a micro base station. The access network device of the next generation network is also referred to as an NR node, and the access network device of the next generation network also includes a macro base station and a micro base station.

Figure 2:
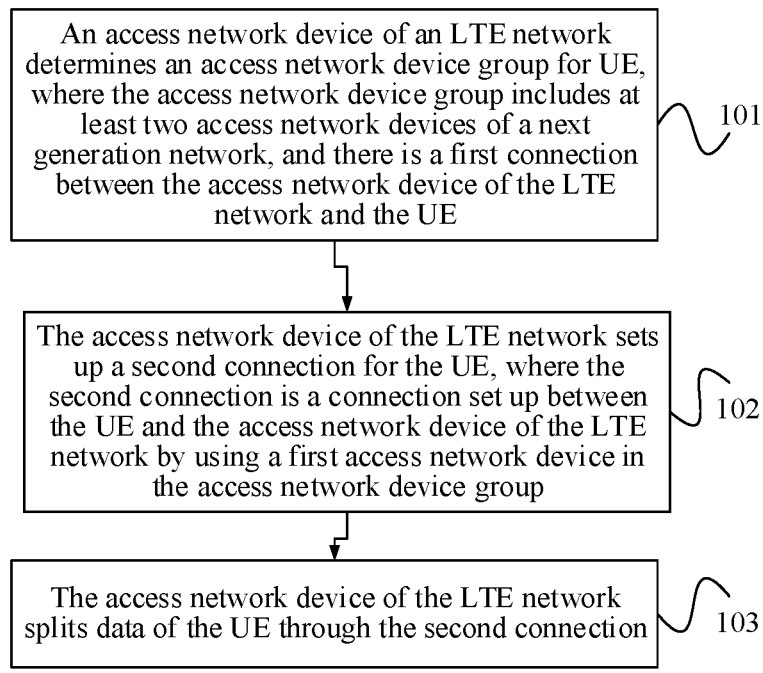
FIG. 2 is a flowchart of a multi-connectivity communication method according to Embodiment 1 of the present disclosure.

Based on the foregoing network architecture, Embodiment 1 of the present disclosure provides a multi-connectivity communication method. FIG. 2 is a flowchart of a multi-connectivity communication method according to Embodiment 1 of the present disclosure. As shown in FIG. 2, the method in this embodiment may include the following steps:

Step 101. An access network device of an LTE network determines an access network device group for UE, where the access network device group includes at least two access network devices of a next generation network, and there is a first connection between the access network device of the LTE network and the UE.

Step 102. The access network device of the LTE network sets up a second connection for the UE, where the second connection is a connection set up between the UE and the access network device of the LTE network through a first access network device in the access network device group.

Step 103. The access network device of the LTE network splits data of the UE through the second connection.

In step 101, in an implementation, the access network device of the LTE network determines the access network device group based on a measurement result of the access network device of the next generation network that is reported by the UE. The measurement result includes signal quality, signal strength, and the like of a plurality of access network devices of the next generation network. Based on the measurement result, the access network device of the LTE network selects at least two access network devices with desirable signal quality and desirable signal strength from the plurality of access network devices of the next generation network to form the access network device group. Only an example is used herein for description, and the access network device of the LTE network may alternatively determine the access network device group in other manners. For example, the access network device of the LTE network may alternatively consider a load status in addition to the measurement result, and preferentially select an access network device of the next generation network with relatively small load to form the access network device group.

In another implementation, the access network device of the LTE network receives a candidate access network device group sent by the UE, where the candidate access network device group includes at least two candidate access network devices of the next generation network that are determined by the UE; and the access network device of the LTE network determines the access network device group based on the candidate access network device group. The UE may determine the candidate access network device group by using a method the same as that used by the access network device of the LTE network, or the UE may determine the candidate access network device group by using a method different from that used by the access network device of the LTE network. The candidate access network device group is used as reference information of the access network device of the LTE network. The access network device of the LTE network further determines the access network device group based on information about the access network device of the next generation network in the candidate access network device group. The access network device group determined by the access network device of the LTE network may be the same as or different from the candidate access network device group reported by the UE.

Optionally, when reporting the candidate access network device group, the UE may also report the measurement result of the access network device of the next generation network and/or a basis on which the UE determines the candidate access network device group, so that the access network device of the LTE network determines the access network device group based on all of the candidate access network device group, the measurement result of the access network device of the next generation network, and the basis on which the UE determines the candidate access network device group.

In the foregoing two implementations, if the access network device of the LTE network determines the access network device based on the result of measurement of the access network device of the next generation network performed by the UE, or determines the candidate access network device based on the measurement result of the access network device of the next generation network, before the access network device of the LTE network determines the access network device group, the access network device of the LTE network sends, to the UE, a measurement indication for the access network device of the next generation network. The measurement indication includes measurement configuration information. The UE performs measurement based on the measurement configuration information, and sends the measurement result to the access network device of the LTE network.

In step 102, the access network device of the LTE network may set up the second connection for the UE in the following manner: The access network device of the LTE network separately sends a dual connectivity adding request to each access network device in the access network device group. The dual connectivity adding request is used to request to add the second connection for the UE. Each access network device in the access network device group separately returns a dual connectivity adding response to the access network device of the LTE network, and the access network device of the LTE network separately receives the dual connectivity adding response returned by each access network device in the access network device group, where the dual connectivity adding response sent by each access network device includes configuration information of the access network device. Then, the access network device of the LTE network sends the configuration information of each access network device in the access network device group to the UE. The access network device of the LTE network may pack configuration information of the access network devices in the access network device group by using an RRC connection reconfiguration message and send the configuration information to the UE, or may separately add the configuration information of each access network device to an RRC message and send the RRC message to the UE, or send the configuration information of each access network device to the UE by using a new RRC message. This is not limited in the present disclosure.

The configuration information of each access network device in the access network device group includes: radio resource configuration information and mobility control information of the UE. The radio resource configuration information includes a bearer identifier of to-be-split data and Media Access Control (MAC for short) configuration information. The mobility control information of the UE is used to indicate a mobility-related parameter of the UE when the UE is served by the access network device of the next generation network. The mobility-related parameter includes: a cell radio network temporary identifier (C-RNTI for short) of the UE, a random access channel (RACH for short) parameter, and an encryption algorithm. The RACH configuration information of the UE is used by the UE to access the access network device of the next generation network. The encryption algorithm is used by the UE to generate a key, so that the UE uses the key and keys of a signaling plane and a user plane that are derived by using the key. The keys of the signaling plane and the user plane are used for encryption and integrity protection of a signaling plane and a data plane between the UE and the access network device of the next generation network. The identifier of the UE may be a cell radio network temporary identifier (CRNTI for short), an international mobile subscriber identity (international mobile subscriber identification number, IMSI for short) allocated by the access network device of the LTE network, or the like.

Optionally, the dual connectivity adding request sent by the access network device of the LTE network to each access network device in the access network device group includes: configuration information of the access network device. Correspondingly, before separately sending the dual connectivity adding request to each access network device in the access network device group, the access network device of the LTE network generates the configuration information for each access network device in the access network device group. Such a manner is applicable to a case in which the access network device of the next generation network has no Radio Resource Control (RRC for short) layer. Because the configuration information of the access network device of the next generation network cannot be generated by an RRC layer of the access network device of the next generation network, in this embodiment, the access network device of the LTE network generates the configuration information for the access network device of the next generation network in advance, and adds the configuration information to the dual connectivity adding request and sends the dual connectivity adding request to the access network device of the next generation network.

Specifically, the access network device of the LTE network may add the configuration information of the access network device of the next generation network to a 5G cell group configuration 5GCG (5G Cell Group, 5GCG for short)-config information element. It should be noted that 5GCG-config is a name newly defined in the present disclosure. Certainly, 5GCG-config may be alternatively replaced with other names. In this embodiment, content in the 5GCG-config information element includes: radio resource configuration information and mobility control information of the UE. Optionally, the 5GCG-config information element further includes a list of primary cells and secondary cells to be added, modified, or released by the access network device of the next generation network as suggested by the access network device of the LTE network, and the like. Based on the list of primary cells and secondary cells that the access network device of the LTE network suggests adding, modifying, or releasing, the access network device of the next generation network determines a list of primary cells and secondary cells that are finally added, modified, or released, and adds the determined list to the dual connectivity adding response and sends the dual connectivity adding response to the access network device of the LTE network.

Optionally, the dual connectivity adding request sent by the access network device of the LTE network to each access network device includes: configuration information of the access network device of the LTE network and a measurement report of each access network device. The configuration information of the access network device is generated by the RRC layer of the access network device based on the configuration information of the access network device of the LTE network and the measurement report of the access network device. Such a manner is applicable to a case in which the access network device of the next generation network has an RRC layer, and the configuration information of the access network device of the next generation network is generated by the RRC layer of the access network device of the next generation network. Specifically, the access network device of the LTE network may add the configuration information of the access network device of the LTE network and the measurement report of the access network device in the access network device group to a 5GCG-configinfo information element. The configuration information of the access network device of the LTE network includes radio resource configuration information of the access network device of the LTE network and a configuration of a secondary cell in the LTE network. Optionally, content of 5GCG-configinfo may further include: a list of secondary cells to be added, modified, or released by the next generation network as suggested. After receiving the dual connectivity adding request, the access network device in the access network device group generates the configuration information of the access network device based on the configuration information of the access network device of the LTE network and the measurement report of the access network device, adds the generated configuration information to the dual connectivity adding response, and sends the dual connectivity adding response to the access network device of the LTE network.

After receiving the configuration information of each access network device in the access network device group, the UE completes splitting configuration on each access network device based on the configuration information, and selects, based on the measurement result of each access network device in the access network device group, the first access network device from the access network device group and accesses the first access network device. Specifically, the UE may select the first access network device based on signal quality, signal strength and the like of each access network device, and initiate a random access process to the first access network device based on RACH information. After accessing the first access network device, the UE sends a configuration complete message to the access network device of the LTE network. The configuration complete message is used to notify the access network device of the LTE network that the second connection is successfully set up.

In an implementation, the UE sends the configuration complete message to the access network device of the LTE network through the first access network device. The configuration complete message includes an identifier of the access network device of the LTE network and an identifier (for example, a C-NRTI) of the UE in the next generation network. The configuration complete message carries the identifier of the access network device of the LTE network, so that the first access network device learns a device to which the configuration complete message is sent.

The UE may add the configuration complete message to an RRC connection setup complete message and send the RRC connection setup complete message to the first access network device, or send the configuration complete message to the first access network device by using a separate message. The first access network device obtains the identifier of the access network device of the LTE network from the configuration complete message, and forwards the configuration complete message to the access network device of the LTE network. The configuration complete message of the access network device group sent by the first access network device to the access network device of the LTE network includes only the identifier of the UE in the next generation network, and does not include the identifier of the access network device of the LTE network. After receiving the configuration complete message, the access network device of the LTE network determines, based on the configuration complete message, that the second connection is successfully set up.

In another implementation, the UE directly sends the configuration complete message to the access network device of the LTE network. The configuration complete message carries an identifier of the first access network device and an identifier of the UE in the next generation network. After receiving the configuration complete message, the access network device of the LTE network determines, based on the configuration complete message, that the second connection is successfully set up, and forwards the configuration complete message to the first access network device based on the identifier of the first access network device. The configuration complete message sent by the access network device of the LTE network to the first access network device includes only the identifier of the UE in the next generation network.

In step 103, the access network device of the LTE network may split uplink data and downlink data of the UE through the second connection. Using downlink data as an example, when a core network needs to send downlink data to the UE, based on a preset splitting rule, the access network device of the LTE network sends a part of the downlink data to the first access network device, to send the part of the downlink data to the UE through the second connection, and directly sends another part of the downlink data to the UE by using the first connection. Because the next generation network has a high transmission rate, a data transmission rate of the UE can be increased by splitting through the second connection. Moreover, load balancing between networks can be implemented by splitting in the next generation network, thereby avoiding frequent handover of the UE between two networks and increasing a throughput of the entire network.

The access network device of the LTE network splits data mainly by using a PDCP layer, and the splitting may be performed by a data packet or a bearer. In this embodiment, to implement communication between the access network device of the LTE network and the access network device of the next generation network, a new user plane protocol stack and a new control plane protocol stack need to be separately defined for the access network device of the LTE network and the access network device of the next generation network.

Figure 3:
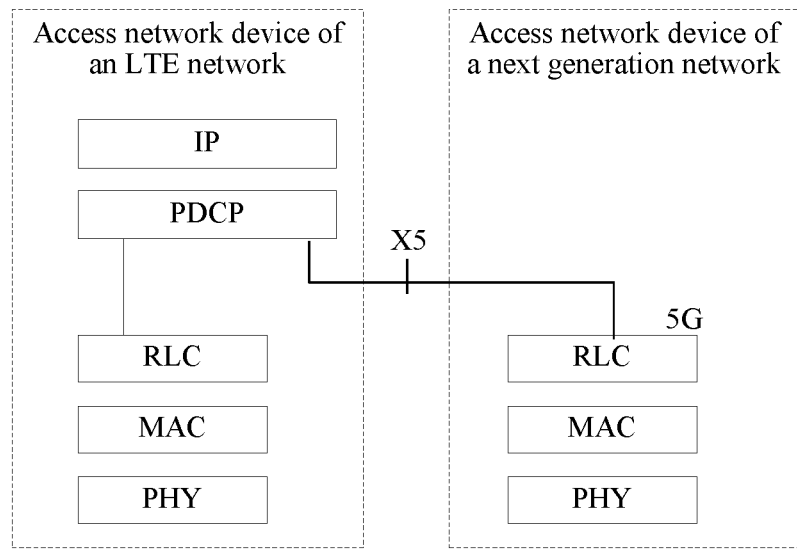
FIG. 3 is a schematic diagram of user plane protocol stacks of an access network device of an LTE network and an access network device of a next generation network.

FIG. 3 is a schematic diagram of user plane protocol stacks of an access network device of an LTE network and an access network device of a next generation network. As shown in FIG. 3, the user plane protocol stack of the access network device of the LTE network includes five layers: an Internet Protocol (IP for short) layer, a PDCP layer, a Radio Link Control (RLC for short) layer, a Media Access Control (MAC for short) layer, and a physical layer (PHY for short) layer. The user plane protocol stack of the access network device of the next generation network may include only three layers: an RLC layer, a MAC layer, and a PHY layer, or may further include a PDCP layer.

Figure 4:
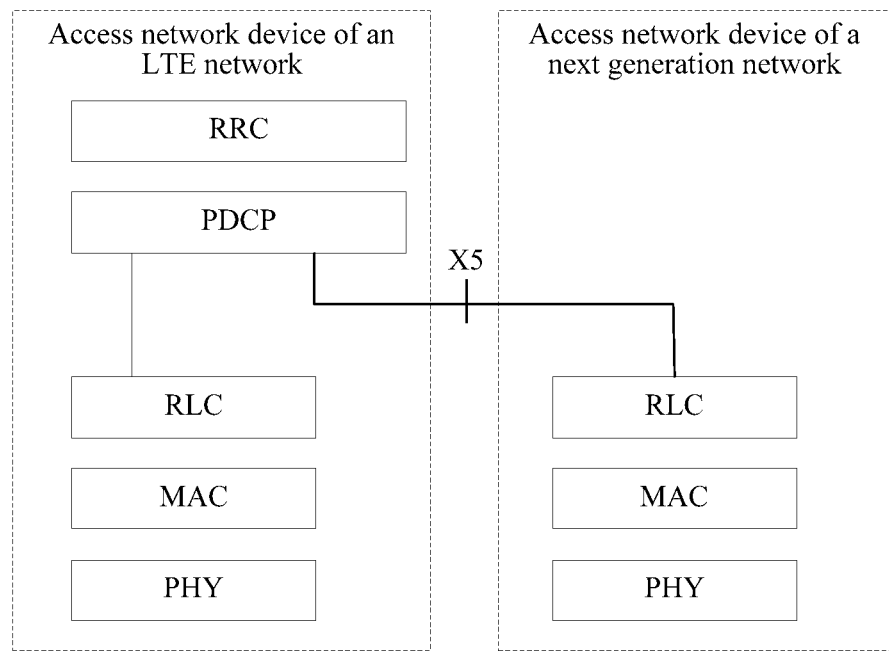
FIG. 4 is a schematic diagram of control plane protocol stacks of an access network device of an LTE network and an access network device of a next generation network.

FIG. 4 is a schematic diagram of control plane protocol stacks of an access network device of an LTE network and an access network device of a next generation network. As shown in FIG. 4, the control plane protocol stack of the access network device of the LTE network includes five layers: an RRC layer, a PDCP layer, an RLC layer, an MAC layer, and a PHY layer. The control plane protocol stack of the access network device of the next generation network may include only three layers: an RLC layer, a MAC layer, and a PHY layer, and may further include an RRC layer and a PDCP layer in addition to the RLC layer, the MAC layer, and the PHY layer.

Figure 5:
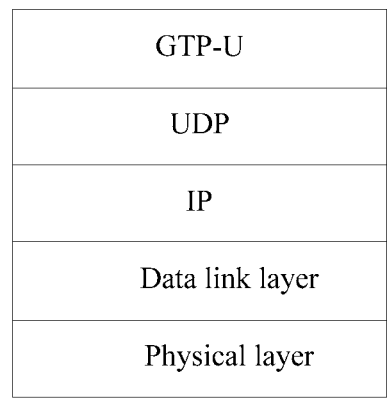
FIG. 5 is a schematic diagram of a user plane protocol stack of an X5 interface.
Figure 6:
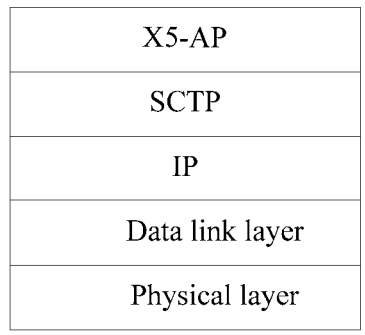
FIG. 6 is a schematic diagram of a control plane protocol stack of an X5 interface.

The access network device of the LTE network and the access network device of the next generation network communicate by using an X5 interface. FIG. 5 is a schematic diagram of a user plane protocol stack of the X5 interface. As shown in FIG. 5, the user plane protocol stack of the X5 interface includes a GPRS tunneling protocol user plane (GTP-U for short) layer, a User Data Protocol (UDP for short) layer, an IP layer, a data link layer, and a physical layer. FIG. 6 is a schematic diagram of a control plane protocol stack of an X5 interface. As shown in FIG. 6, the control plane protocol stack of the X5 interface includes an X5-AP layer, a Stream Control Transmission Protocol (SCTP for short) layer, an IP layer, a data link layer, and a physical layer.

In this embodiment, the access network device of the LTE network determines the access network device group for the UE, where the access network device group includes at least two access network devices of the next generation network, and sets up the second connection between the UE and the first access network device in the access network device group. Subsequently, the data of the UE may be split through the second connection. According to the method, the access network device of the LTE network actively adds the second connection between the UE and the next generation network, so that dual connectivity between the UE and both the LTE network and the next generation network is implemented, thereby increasing a data transmission rate of the UE and increasing a throughput of the entire network.

Figure 7:
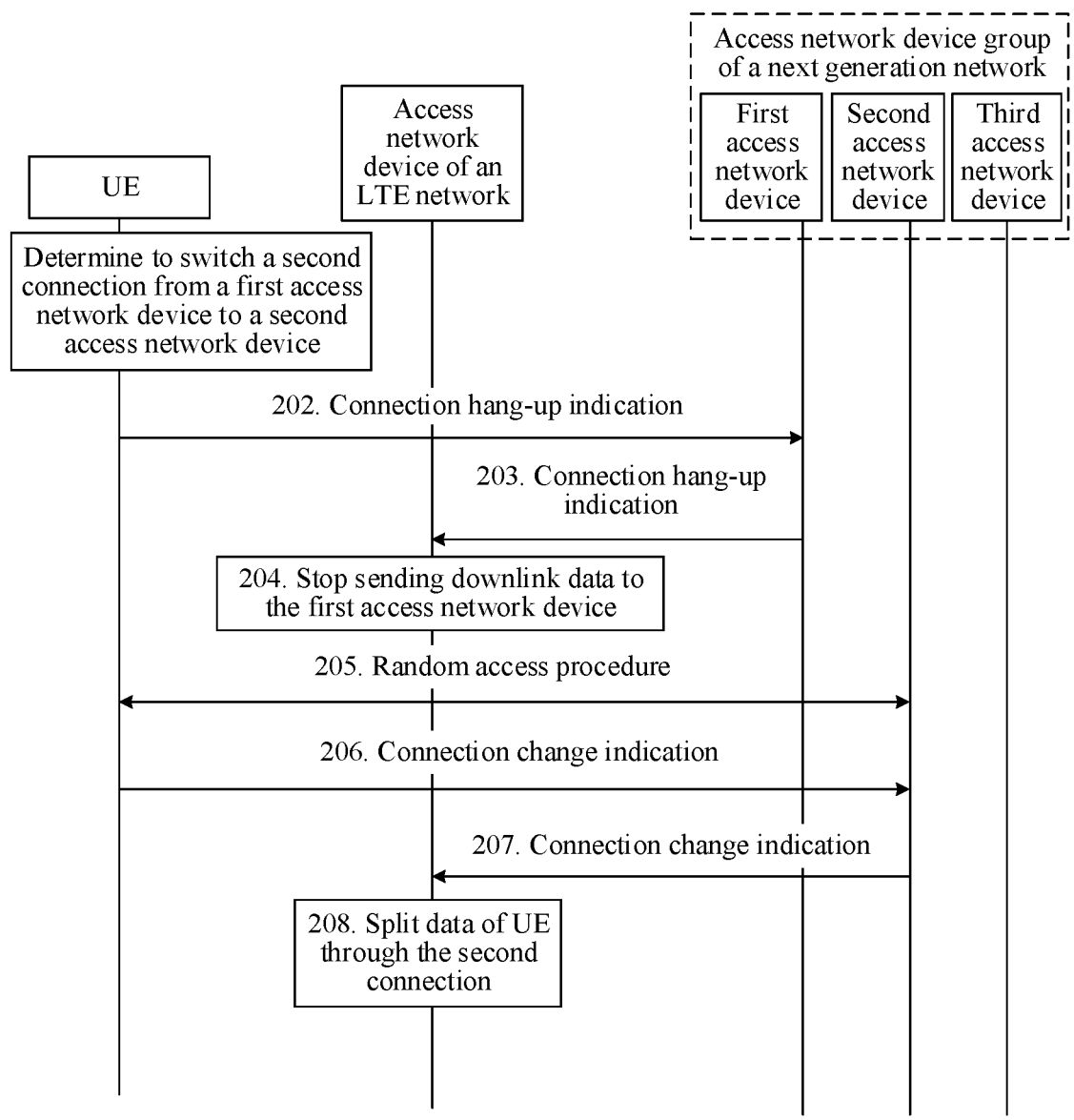
FIG. 7 is a flowchart of a multi-connectivity communication method according to Embodiment 2 of the present disclosure.

FIG. 7 is a flowchart of a multi-connectivity communication method according to Embodiment 2 of the present disclosure. Based on Embodiment 1, how UE is handed over between cells in a moving process of the UE is described in the method in this embodiment. As shown in FIG. 7, the method provided in this embodiment may include the following steps:

Step 201. The UE determines to switch the second connection from the first access network device to a second access network device in the access network device group.

Step 202. The UE sends a connection hang-up indication to the first access network device, where the connection hang-up indication is used to instruct the access network device of the LTE network to stop sending downlink data to the first access network device.

Step 203. The first access network device sends the connection hang-up indication to the access network device of the LTE network.

Step 204. The access network device of the LTE network stops sending the downlink data to the first access network device according to the connection hang-up indication.

Step 205. The UE initiates a random access procedure to the second access network device based on configuration information of the second access network device.

Step 206. The UE sends a connection change indication to the second access network device, where the connection change indication is used to instruct the access network device of the LTE network to switch the second connection from the first access network device to the second access network device.

Step 207. The second access network device sends the connection change indication to the access network device of the LTE network.

Step 208. The access network device of the LTE network splits data of the UE through the second connection.

In step 201, after the access network device of the LTE network sets up the second connection for the UE, the UE measures the access network devices in the access network device group, and determines, based on a measurement result, whether to be handed over between cells. In the example shown in FIG. 7, there are three access network devices in the access network device group: the first access network device, the second access network device, and a third access network device.

When cell handover needs to be performed due to poor signal quality of the first access network device or other reasons, the UE sends the connection hang-up indication to the first access network device. The connection hang-up indication includes an identifier of the access network device of the LTE network. After receiving the connection hang-up indication, the first access network device learns that the access network device of the LTE network is to stop sending downlink data to the first access network device, and sends the connection hang-up indication to the access network device of the LTE network based on the identifier of the access network device of the LTE network. The connection hang-up indication is used to instruct the access network device of the LTE network to stop sending the downlink data to the first access network device. After receiving the connection hang-up indication, the access network device of the LTE network stops sending data to the first access network device.

Optionally, after the first access network device sends the connection hang-up indication to the access network device of the LTE network, if a cache of the first access network device stores downlink data that has not been sent to the UE, the first access network device may forward the data in the cache to the access network device of the LTE network by data forwarding. Certainly, after sending the connection hang-up indication to the access network device of the LTE network, the first access network device may not perform data forwarding, and sending of the downlink data to the first access network device is directly stopped.

In this embodiment, the UE sends the connection hang-up indication to the access network device of the LTE network through the first access network device. It should be noted that alternatively, the UE may directly send the connection hang-up indication to the access network device of the LTE network. Optionally, after receiving the connection hang-up indication sent by the UE, the access network device of the LTE network may also send the connection hang-up indication to the first access network device, and notify the first access network device that the access network device of the LTE network stops sending data to the first access network device. Certainly, the access network device of the LTE network may alternatively not send the connection hang-up indication to the first access network device.

When the UE sends the connection hang-up indication to the access network device of the LTE network through the first access network device, the UE may add the connection hang-up indication to a MAC CE information element, or the UE adds the connection hang-up indication to a PDCP report. When a second connection hang-up indication is carried in the MAC CE information element, a format of the MAC CE information element may be indicated by using a logical channel identifier (LCID for short) field in a MAC PDU subheader, and the connection hang-up indication is added to the LCID, to instruct the access network device of the LTE network to suspend sending to-be-split data.

After sending the connection hang-up indication, the UE determines, based on the measurement result of each access network device in the access network device group, to access the second access network device in the access network device group, then initiates a random access procedure to the second access network device based on RACH information included in configuration information of the second access network device, and accesses the second access network device. In this embodiment, because the UE has obtained configuration information of all the access network devices in the access network device group when initially accessing the access network device in the access network device group, the UE does not need to obtain the configuration information of the second access network device in a switching process again, to be rapidly handed over to the second access network device.

After accessing the second access network device, the UE sends the connection change indication to the second access network device, and the connectivity change indication is used to instruct the access network device of the LTE network to switch the second connection from the first access network device to the second access network device. The second access network device receives the connection change indication sent by the UE, and learns, based on the connection change indication, that the access network device of the LTE network is to set up the second connection for the UE through the second access network device, and sends the connection change indication to the access network device of the LTE network. The access network device of the LTE network receives the connection change indication, and determines that the second connection is switched from the first access network device to the second access network device.

In this embodiment, the UE sends the connection change indication to the access network device of the LTE network through the second access network device. It should be noted that alternatively, the UE may directly send the connectivity change indication to the access network device of the LTE network. After receiving the connection change indication sent by the UE, the access network device of the LTE network sends the connection change indication to the second access network device, and notifies the second access network device that the access network device of the LTE network sets up the second connection for the UE through the second access network device.

After the access network device of the LTE network switches the second connection to the second access network device, the access network device of the LTE network splits the data of the UE to the second access network device through the second connection for transmission, thereby increasing a data transmission rate of the UE.

In this embodiment, because the UE has obtained the configuration information of all the access network devices in the access network device group when initially setting up the second connection to the access network device in the access network device group, when the UE is switched between cells in the access network device group, configuration information of a target access network device (the second access network device) to which the UE is switched does not need to be obtained, so that cell handover duration can be reduced, thereby implementing fast handover and reducing delay caused by cell handover.

Figure 8:
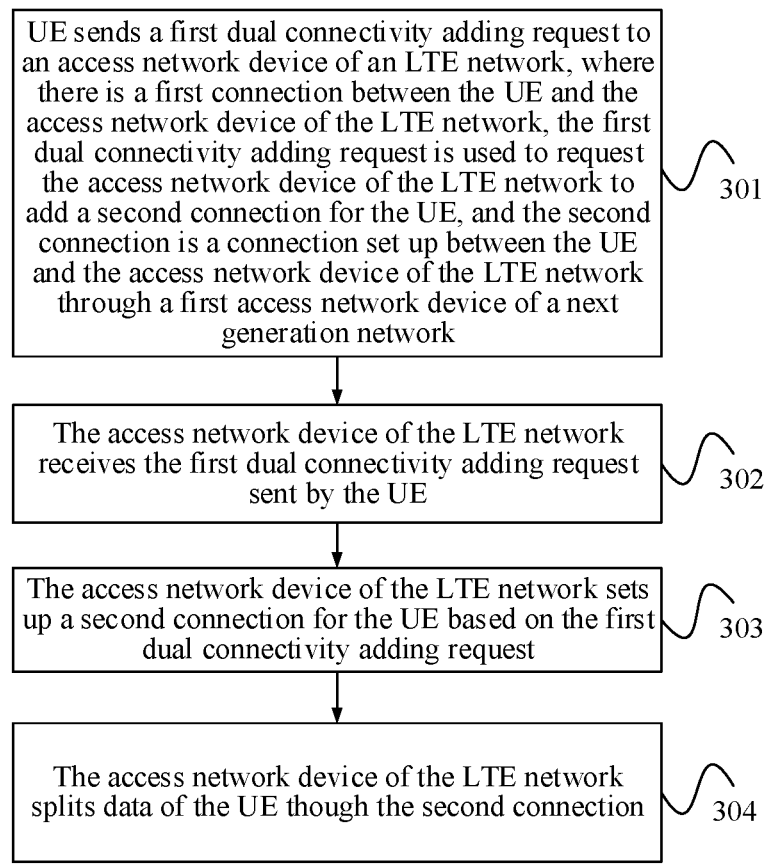
FIG. 8 is a flowchart of a multi-connectivity communication method according to Embodiment 3 of the present disclosure.

FIG. 8 is a flowchart of a multi-connectivity communication method according to Embodiment 3 of the present disclosure. As shown in FIG. 8, the method in this embodiment may include the following steps:

Step 301. UE sends a first dual connectivity adding request to an access network device of an LTE network, where there is a first connection between the UE and the access network device of the LTE network, the first dual connectivity adding request is used to request the access network device of the LTE network to add a second connection for the UE, and the second connection is a connection set up between the UE and the access network device of the LTE network through a first access network device of a next generation network.

Step 302. The access network device of the LTE network receives the first dual connectivity adding request sent by the UE.

Step 303. The access network device of the LTE network sets up a second connection for the UE based on the first dual connectivity adding request.

Step 304. The access network device of the LTE network splits data of the UE through the second connection.

In this embodiment, the UE actively sets up the second connection, and when the UE determines that the second connection needs to be set up, the UE sends the first dual connectivity adding request to the access network device of the LTE network. Before the UE sends the first dual connectivity adding request, the UE measures a plurality of access network devices of the next generation network, and selects a first access network device of the next generation network for access based on a measurement result.

In step 301, in an implementation, the UE first sends the first dual connectivity adding request to the first access network device, where the first dual connectivity adding request needs to include an identifier of the access network device of the LTE network and an identifier of the UE. The first access network device learns, based on the first dual connectivity adding request, that the access network device of the LTE network is to set up the second connection for the UE through the first access network device, and sends the first dual connectivity adding request to the access network device of the LTE network based on the identifier of the access network device of the LTE network. In another implementation, the UE directly sends the first dual connectivity adding request to the access network device of the LTE network, where the first dual connectivity adding request includes an identifier of the UE and an identifier of the first access network device; and the access network device of the LTE network determines, based on the first dual connectivity adding request, to set up the second connection for the UE through the first access network device.

In step 303, specifically, the access network device of the LTE network sends a second dual connectivity adding request to the first access network device based on the first dual connectivity adding request, where the second dual connectivity adding request is used to request the first access network device to allow the access network device of the LTE network to add the second connection for the UE. Optionally, the second dual connectivity adding request includes configuration information of the first access network device. In this embodiment, because the UE has accessed the first access network device, the configuration information of the first access network device includes only radio resource configuration information and does not include mobility control information of the UE, and the radio resource configuration information includes a bearer identifier of to-be-split data, MAC layer configuration information, and the like.

Correspondingly, before the access network device of the LTE network sends the second dual connectivity adding request to the first access network device, the access network device of the LTE network generates the configuration information for the first access network device. Such a manner is applicable to a case in which the access network device of the next generation network has no RRC layer. Because configuration information of the access network device of the next generation network cannot be generated by an RRC layer of the access network device of the next generation network, in this embodiment, the access network device of the LTE network generates the configuration information for the first access network device in advance, and adds the configuration information of the first access network device to the second dual connectivity adding request and sends the second dual connectivity adding request to the first access network device. Optionally, the second dual connectivity adding request includes a list of primary cells and secondary cells to be added, modified, or released by the first access network device as suggested by the access network device of the LTE network.

Optionally, the second dual connectivity adding request includes configuration information of the access network device of the LTE network and a measurement report of the first access network device. The configuration information of the first access network device included in a second dual connectivity adding response is generated by an RRC layer of the first access network device based on the configuration information of the access network device of the LTE network and the measurement report of the first access network device. Such a manner is applicable to a case in which the access network device of the next generation network has an RRC layer, and the configuration information of the access network device of the next generation network is generated by the RRC layer of the access network device of the next generation network.

After the first access network device receives the second dual connectivity adding request, if the second dual connectivity adding request includes the configuration information of the first access network device, the first access network device may add the configuration information of the first access network device to the second dual connectivity adding response and send the second dual connectivity adding response to the access network device of the LTE network. The second dual connectivity adding response may alternatively not include the configuration information of the first access network device. If the second dual connectivity adding request includes a list of primary cells and secondary cells to be added, modified, or released by the first access network device as suggested by the access network device of the LTE network, based on the list of primary cells and secondary cells that the access network device of the LTE network suggests adding, modifying, or releasing, the first access network device determines a list of primary cells and secondary cells that are finally added, modified, or released, and adds the determined list to the second dual connectivity adding response and sends the second dual connectivity adding response to the access network device of the LTE network. If the second dual connectivity adding request includes configuration information of the access network device of the LTE network and a measurement report of the first access network device, the RRC layer of the first access network device generates the configuration information of the first access network device based on the configuration information of the access network device of the LTE network and the measurement report of the first access network device, adds the configuration information of the first access network device to the second dual connectivity adding response and sends the second dual connectivity adding response to the access network device of the LTE network.

After receiving the second dual connectivity adding response sent by the first access network device, the access network device of the LTE network sends the configuration information of the first access network device to the UE. After receiving the configuration information of the first access network device that is sent by the access network device of the LTE network, the UE performs splitting configuration based on the configuration information of the first access network device, and sends a first configuration complete message to the access network device of the LTE network. The first configuration complete message is used to notify the access network device of the LTE network that the second connection is successfully set up. After receiving the first configuration complete message sent by the UE, the access network device of the LTE network determines that the second connection is successfully set up.

In step 304, the access network device of the LTE network may split uplink data and downlink data of the UE through the second connection.

In this embodiment, the UE determines to add the second connection and sends the first dual connectivity adding request to the access network device of the LTE network, to request the access network device of the LTE network to add the second connection for the UE through the access network device of the next generation network. The access network device of the LTE network sets up the second connection for the UE based on the first dual connectivity adding request. Because the next generation network has a high transmission rate, a data transmission rate of the UE can be increased by splitting through the second connection. Moreover, load balancing between networks can be implemented by splitting in the next generation network, thereby avoiding frequent handover of the UE between two networks and increasing a throughput of the entire network.

Figure 9:
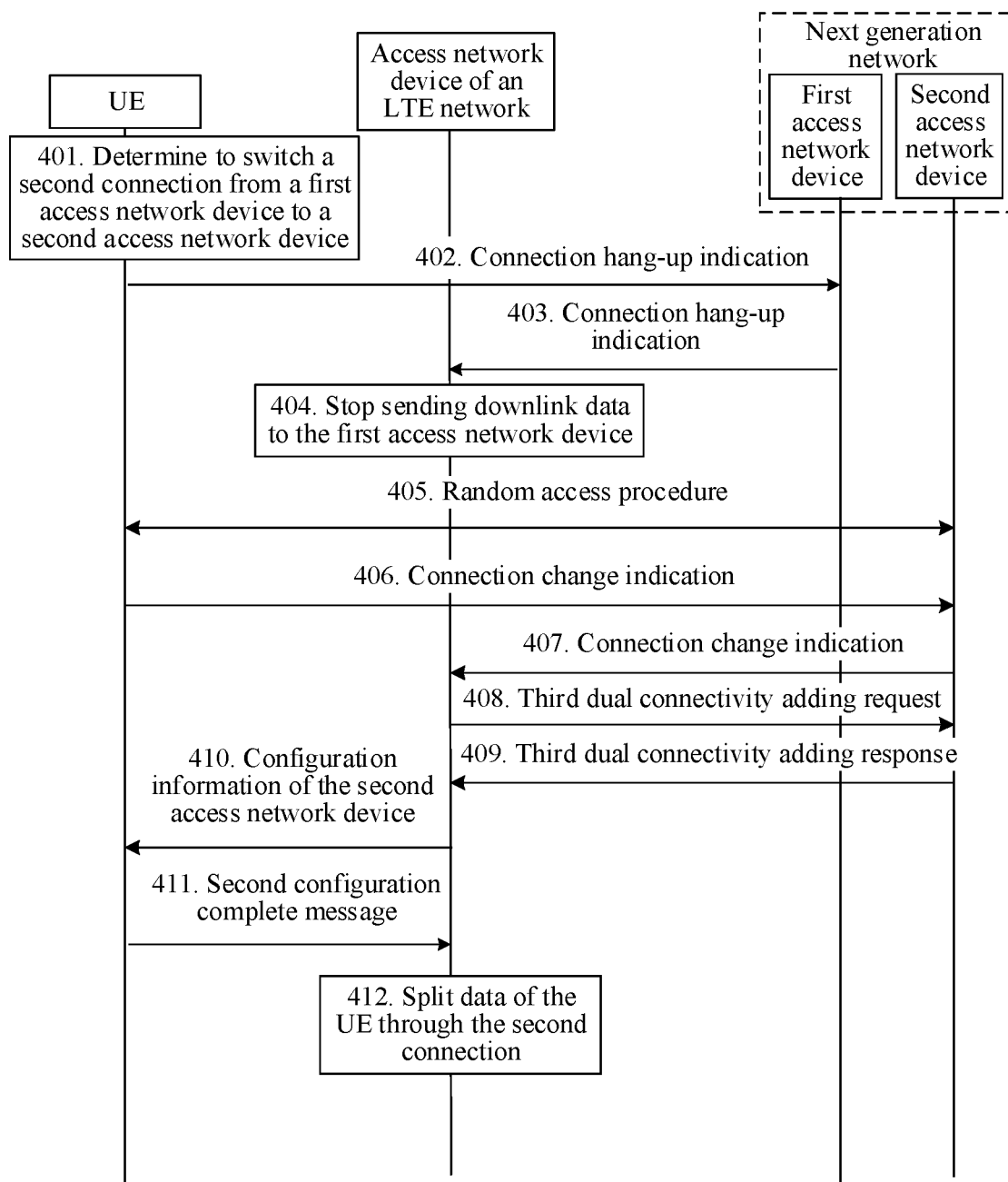
FIG. 9 is a flowchart of a multi-connectivity communication method according to Embodiment 4 of the present disclosure.

FIG. 9 is a flowchart of a multi-connectivity communication method according to Embodiment 4 of the present disclosure. Based on Embodiment 3, how the UE is handed over between cells in a moving process of the UE is described in the method in this embodiment. As shown in FIG. 9, the method provided in this embodiment may include the following steps:

Step 401. The UE determines to switch the second connection from the first access network device to a second access network device of the next generation network.

Step 402. The UE sends a connection hang-up indication to the first access network device, where the connection hang-up indication is used to instruct the access network device of the LTE network to stop sending downlink data to the first access network device.

Step 403. The first access network device sends the connection hang-up indication to the access network device of the LTE network.

Step 404. The access network device of the LTE network stops sending the downlink data to the first access network device according to the connection hang-up indication.

Step 405. The UE initiates a random access procedure to the second access network device.

Step 406. The UE sends a connection change indication to the second access network device, where the connection change indication is used to instruct the access network device of the LTE network to switch the second connection from the first access network device to the second access network device.

Step 407. The second access network device sends the connection hang-up indication to the access network device of the LTE network.

Step 408. The access network device of the LTE network sends a third dual connectivity adding request to the second access network device according to the connection change indication, where the third dual connectivity adding request is used to request the second access network device to allow the access network device of the LTE network to add the second connection for the UE.

Step 409. The second access network device sends a third dual connectivity adding response to the access network device of the LTE network, where the third dual connectivity adding response includes configuration information of the second access network device.

Step 410. The access network device of the LTE network sends the configuration information of the second access network device to the UE.

Step 411. The UE sends a second configuration complete message to the access network device of the LTE network, where the second configuration complete message is used to notify the access network device of the LTE network that the second connection is successfully changed.

Step 412. The access network device of the LTE network splits data of the UE through the second connection.

Optionally, after the first access network device sends a second connection hang-up indication to the access network device of the LTE network, if a cache of the first access network device stores downlink data that has not been sent to the UE, the first access network device may forward the data in the cache to the access network device of the LTE network by data forwarding. Certainly, after sending the second connection hang-up indication to the access network device of the LTE network, the first access network device may not perform data forwarding, and sending of the downlink data to the first access network device is directly stopped.

In this embodiment, after the UE sends the connection hang-up indication to the access network device of the LTE network through the first access network device, it should be noted that alternatively, the UE may directly send the connection hang-up indication to the access network device of the LTE network. For a specific implementation, refer to the description of Embodiment 2, and details are not described herein again.

In step 408, optionally, the third dual connectivity adding request includes the configuration information of the second access network device. The configuration information of the second access network device is generated by the access network device of the LTE network. In this embodiment, because the UE has accessed the second access network device, the configuration information of the second access network device includes only radio resource configuration information and does not include mobility control information of the UE. The radio resource configuration information includes a bearer identifier of to-be-split data, MAC layer configuration information, and the like. Such a manner is applicable to a case in which the access network device of the next generation network does not have an RRC layer. Optionally, the third dual connectivity adding request further includes a list of primary cells and secondary cells to be added, modified, or released by the second access network device as suggested by the access network device of the LTE network. Based on the list of primary cells and secondary cells that the access network device of the LTE network suggests adding, modifying, or releasing, the second access network device determines a list of primary cells and secondary cells that are finally added, modified, or released, and adds the determined list of cells to the third dual connectivity adding response.

Optionally, the third dual connectivity adding request includes configuration information of the access network device of the LTE network and a measurement report of the second access network device. The configuration information of the second access network device included in the third dual connectivity adding response is generated by an RRC layer of the second access network device based on the configuration information of the access network device of the LTE network and the measurement report of the second access network device. Such a manner is applicable to a case in which the access network device of the next generation network has an RRC layer.

In this embodiment, because the UE has accessed the second access network device, the configuration information of the second access network device includes only radio resource configuration information and does not include mobility control information of the UE. The radio resource configuration information includes a bearer identifier of to-be-split data, MAC layer configuration information, and the like.

After receiving the configuration information of the second access network device, the UE performs splitting configuration based on the configuration information, and sends a second configuration complete message to the access network device of the LTE network after the configuration is completed. The access network device of the LTE network determines, based on the second configuration complete message, that the second connection is successfully changed.

In this embodiment, when the UE determines to switch the second connection from the first access network device to the second access network device, the UE first sends the connection hang-up indication to the access network device of the LTE network, and the access network device of the LTE network switches the second connection from the first access network device to the second access network device according to the connection hang-up indication. In the method, the UE determines to perform cell handover and triggers a cell handover procedure, so that a decision procedure on a network side is reduced and network side resources are saved.

Figure 10:
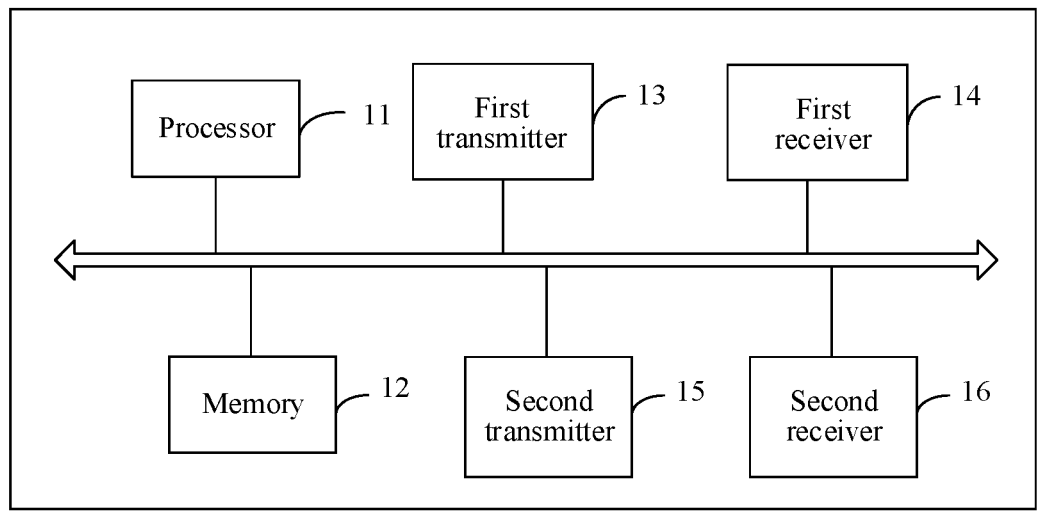
FIG. 10 is a schematic structural diagram of an access network device of an LTE network according to Embodiment 5 of the present disclosure.

FIG. 10 is a schematic structural diagram of an access network device of an LTE network according to Embodiment 5 of the present disclosure. As shown in FIG. 10, the access network device of the LTE network in this embodiment includes: a processor 11, a memory 12, a first transmitter 13, a first receiver 14, a second transmitter 15, and a second receiver 16. The memory 12, the first transmitter 13, the first receiver 14, the second transmitter 15, and the second receiver 16 are connected to and communicate with the processor 11 by using a system bus. The memory 12 is configured to store a computer program, the processor 11 is configured to run the program stored in the memory 12, the first transmitter 13 is configured to send data to UE, the first receiver 14 is configured to receive data sent by the UE, the second transmitter 15 is configured to send data to an access network device of a next generation network, and the second receiver 16 is configured to receive data sent by an access network device of the next generation network. The second transmitter 15 and the second receiver 16 present an X5 interface, and the X5 interface is an interface newly added between the access network device of the LTE network and the access network device of the next generation network. The access network device of the LTE network provided in this embodiment can be configured to perform the methods in Embodiment 1 and Embodiment 2. Their specific implementations and technical effects are similar, and details are not described herein again.

Figure 11:
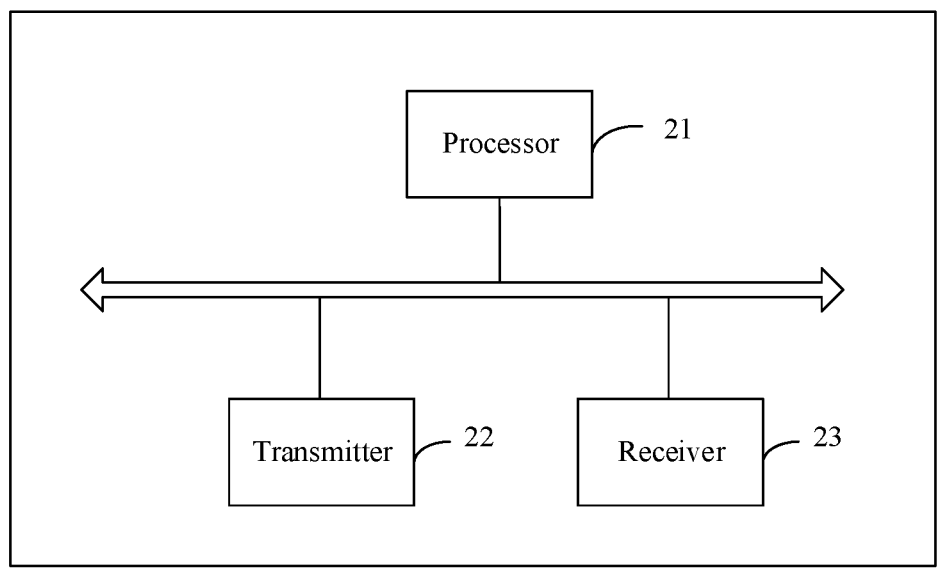
FIG. 11 is a schematic structural diagram of UE according to Embodiment 6 of the present disclosure.

FIG. 11 is a schematic structural diagram of UE according to Embodiment 6 of the present disclosure. As shown in FIG. 11, the UE in this embodiment includes: a processor 21, a transmitter 22, and a receiver 23. The transmitter 22 and the receiver 23 are connected to and communicate with the processor 21 by using a system bus, the transmitter 22 is configured to send data to an access network device of an LTE network and an access network device of a next generation network, the receiver 23 is configured to receive data sent by the access network device of the LTE network and the access network device of the next generation network, and the processor 21 is configured to process data. The UE provided in this embodiment can be configured to perform the methods in Embodiment 1 and Embodiment 2. Their specific implementations and technical effects are similar, and details are not described herein again.

Figure 12:
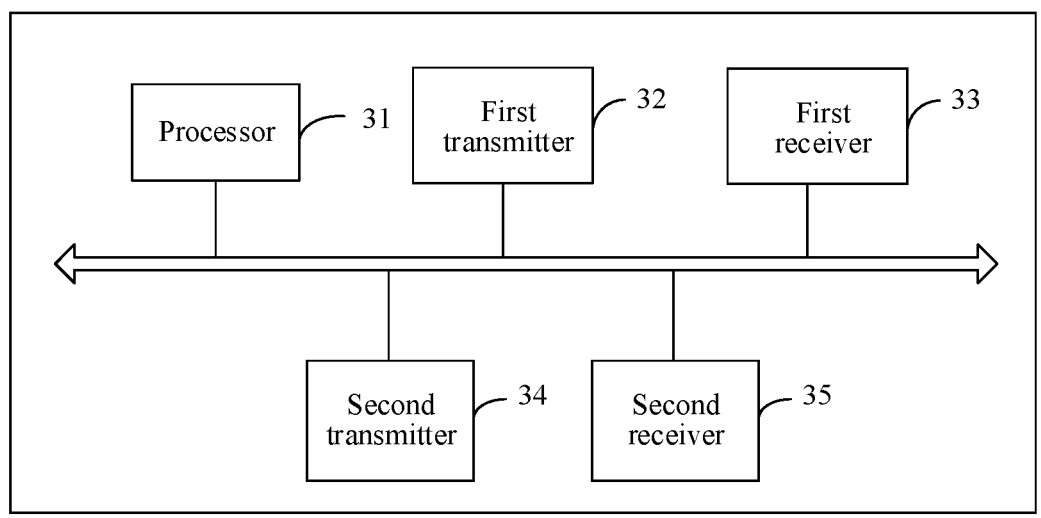
FIG. 12 is a schematic structural diagram of an access network device of an LTE network according to Embodiment 7 of the present disclosure.

FIG. 12 is a schematic structural diagram of an access network device of an LTE network according to Embodiment 7 of the present disclosure. As shown in FIG. 12, the access network device of the LTE network in this embodiment includes: a processor 31, a first transmitter 32, a first receiver 33, a second transmitter 34, and a second receiver 35. The first transmitter 32, the first receiver 33, the second transmitter 34, and the second receiver 35 are connected to and communicate with the processor 31 by using a system bus. The processor 31 is configured to process data, the first transmitter 32 is configured to send data to UE, the first receiver 33 is configured to receive data sent by the UE, the second transmitter 34 is configured to send data to an access network device of a next generation network, and the second receiver 35 is configured to receive data sent by the access network device of the next generation network. The second transmitter 34 and the second receiver 35 present an X5 interface, and the X5 interface is an interface newly added between the access network device of the LTE network and the access network device of the next generation network. The access network device of the LTE network in this embodiment can be configured to perform the methods in Embodiment 3 and Embodiment 4. Their specific implementations and technical effects are similar, and details are not described herein again.

Embodiment 8 of the present disclosure provides UE. A structure of the UE in this embodiment and a structure of the UE shown in FIG. 11 are the same. The UE in this embodiment can be configured to perform the methods in Embodiments 3 and Embodiment 4. Their specific implementations and technical effects are similar, and details are not described herein again.

Figure 13:
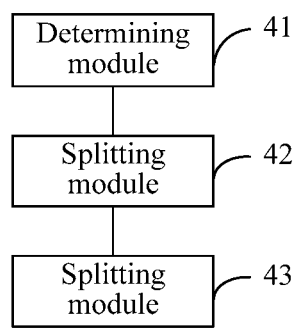
FIG. 13 is a schematic structural diagram of an access network device of an LTE network according to Embodiment 9 of the present disclosure.

FIG. 13 is a schematic structural diagram of an access network device of an LTE network according to Embodiment 9 of the present disclosure. As shown in FIG. 13, the access network device of the LTE network in this embodiment includes: a determining module 41, a setup module 42, and a splitting module 43. The determining module 41 is configured to determine an access network device group for UE, where the access network device group includes at least two access network devices of a next generation network. There is a first connection between the access network device of the LTE network and the UE. The setup module 42 is configured to set up a second connection for the UE, where the second connection is a connection set up between the UE and the access network device of the LTE network through a first access network device in the access network device group. The splitting module 43 is configured to split data of the UE through the second connection.

Further, the access network device of the LTE network may further include: a first sending module, a first receiving module, a second sending module, and a second receiving module (not shown in FIG. 8). The first sending module is configured to send data to UE, the first receiving module is configured to receive data sent by the UE, the second sending module is configured to send data to an access network device of a next generation network, the second receiving module is configured to receive data sent by the access network device of the next generation network, the processing module is configured to communicate with the first sending module, the first receiving module, the second sending module, and the second receiving module, and process data. The access network device of the LTE network in this embodiment can be configured to perform the methods in Embodiment 1 and Embodiment 2 by using the foregoing function modules. Their specific implementations and technical effects are similar, and details are not described herein again.

It should be noted that the first sending module and the second sending module may be implemented by using two physical units. Certainly, the first sending module and the second sending module may be implemented by using one physical unit. Similarly, the first receiving module and the second receiving module may be implemented by using two physical units or one physical unit. In addition, the determining module 41, the setup module 42, and the splitting module 43 may be implemented by using one processing module, that is, the processing module has all the functions of the determining module 41, the setup module 42 and the splitting module 43. This is not limited herein.

Figure 14:
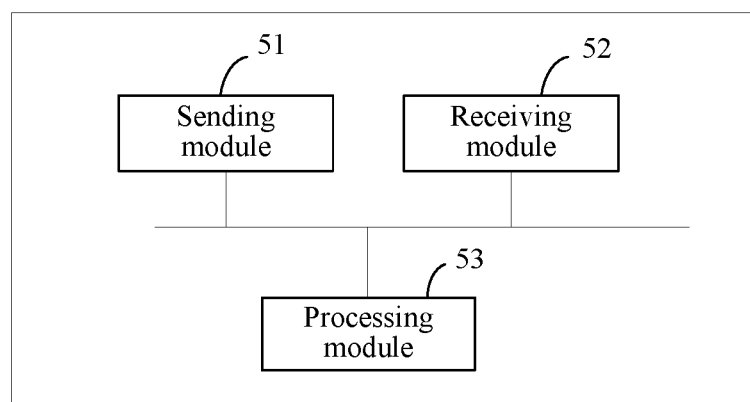
FIG. 14 is a schematic structural diagram of UE according to Embodiment 10 of the present disclosure.

FIG. 14 is a schematic structural diagram of UE according to Embodiment 10 of the present disclosure. As shown in FIG. 14, the UE in this embodiment includes: a sending module 51, a receiving module 52, and a processing module 53. The sending module 51 is configured to send data to an access network device of an LTE network and an access network device of a next generation network, the receiving module 52 is configured to receive data sent by the access network device of the LTE network and the access network device of the next generation network, and the processing module 53 is configured to communicate with the sending module 51 and the receiving module 52 and process data.

In the several embodiments provided in the present disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be split on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of the present disclosure. The foregoing storage medium includes: any medium that can store program code, such as a USB flash drive, a removable hard disk, a read-only memory (ROM for short), a random access memory (RAM for short), a magnetic disk, or an optical disc.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A multi-connectivity communication method, comprising:
    determining, by an access network device of a Long Term Evolution (LTE) network, an access network device group for user equipment (UE), wherein the access network device group comprises at least two access network devices of a next generation network, and there is a first connection between the access network device of the LTE network and the UE;
    setting up, by the access network device of the LTE network, a second connection for the UE, wherein the second connection is a connection set up between the UE and the access network device of the LTE network through a first access network device in the access network device group, and wherein the setting up comprises:
        separately sending, by the access network device of the LTE network, a dual connectivity adding request to each access network device in the access network device group, wherein the dual connectivity adding request requests to add the second connection for the UE;
        separately receiving, by the access network device of the LTE network, a dual connectivity adding response from each access network device of the next generation network, wherein the dual connectivity adding response from each access network device of the next generation network comprises configuration information of the respective access network device of the next generation network;
        sending, by the access network device of the LTE network, the configuration information of each access network device of the next generation network to the UE;
        receiving, by the access network device of the LTE network, a configuration complete message from the UE; and
        determining, based on the configuration complete message, that the second connection is successfully set up; and
    splitting, by the access network device of the LTE network, data of the UE through the second connection.

2. The method according to claim 1, wherein after the setting up, by the access network device of the LTE network, the second connection for the UE, the method further comprises:
    receiving, by the access network device of the LTE network, a connection hang-up indication from the UE, wherein the connection hang-up indication instructs the access network device of the LTE network to stop sending downlink data to the first access network device; and
    receiving, by the access network device of the LTE network, a connection change indication from the UE, wherein the connection change indication instructs the access network device of the LTE network to switch the second connection from the first access network device to a second access network device in the access network device group.

3. The method according to claim 1, wherein the dual connectivity adding request from the access network device of the LTE network to each access network device of the next generation network comprises the configuration information of the access network device of the next generation network; and
    before the separately sending, by the access network device of the LTE network, the dual connectivity adding request to each access network device in the access network device group, the method further comprises:
    generating, by the access network device of the LTE network, the configuration information for each access network device of the next generation network.

4. The method according to claim 1, wherein the dual connectivity adding request from the access network device of the LTE network to each access network device of the next generation network comprises: configuration information of the access network device of the LTE network and a measurement report of each access network device of the next generation network, wherein the configuration information of the access network device of the next generation network is generated by a Radio Resource Control (RRC) layer of the access network device of the next generation network based on the configuration information of the access network device of the LTE network and the measurement report of the access network device of the next generation network.

5. The method according to claim 1, wherein determining, by the access network device of the LTE network, the access network device group for UE comprises:
   receiving, by the access network device of the LTE network, a candidate access network device group from the UE, wherein the candidate access network device group comprises at least two candidate access network devices of the next generation network that are determined by the UE; and
   determining, by the access network device of the LTE network, the access network device group based on the candidate access network device group.

6. An access network device of a Long Term Evolution (LTE) network, comprising a processor and a memory, wherein the memory is configured to store a program, and the processor is configured to run the program to perform the following steps:
   determining an access network device group for user equipment (UE), wherein the access network device group comprises at least two access network devices of a next generation network, and there is a first connection between the access network device of the LTE network and the UE;
   setting up a second connection for the UE, wherein the second connection is a connection set up between the UE and the access network device of the LTE network through a first access network device in the access network device group, and wherein the setting up comprises:
      separately sending a dual connectivity adding request to each access network device in the access network device group, wherein the dual connectivity adding request requests to add the second connection for the UE;
      separately receiving a dual connectivity adding response from each access network device of the next generation network, wherein the dual connectivity adding response from each access network device of the next generation network comprises configuration information of the respective access network device of the next generation network;
      sending the configuration information of each access network device of the next generation network to the UE;
      receiving a configuration complete message from the UE; and
      determining, based on the configuration complete message, that the second connection is successfully set up; and
   splitting data of the UE through the second connection.

7. The device according to claim 6, wherein the processor is configured to run the program to further perform the following steps:
   receiving a connection hang-up indication from the UE, wherein the connection hang-up indication instructs the access network device of the LTE network to stop sending downlink data to the first access network device; and
   receiving a connection change indication from the UE, wherein the connection change indication instructs the access network device of the LTE network to switch the second connection from the first access network device to a second access network device in the access network device group.

8. The device according to claim 6, wherein the dual connectivity adding request to each access network device of the next generation network comprises the configuration information of the access network device of the next generation network; and
   the processor is further configured to generate the configuration information for each access network device of the next generation network.

9. The device according to claim 6, wherein the dual connectivity adding request to each access network device of the next generation network comprises: configuration information of the access network device of the LTE network and a measurement report of each access network device of the next generation network, wherein the configuration information of the access network device of the next generation network is generated by a Radio Resource Control (RRC) layer of the access network device of the next generation network based on the configuration information of the access network device of the LTE network and the measurement report of the access network device of the next generation network.

10. The device according to claim 6, wherein the processor is configured to run the program to further perform the following steps:
    receiving a candidate access network device group from the UE, wherein the candidate access network device group comprises at least two candidate access network devices of the next generation network that are determined by the UE; and
    determining the access network device group based on the candidate access network device group.

11. User equipment (UE), comprising:
    a receiver, configured to receive configuration information that is of access network devices in an access network device group and that is from an access network device of a Long Term Evolution (LTE) network, wherein the access network device group comprises at least two access network devices of a next generation network;
    a processor, configured to access a first access network device in the access network device group based on configuration information of the first access network device in the access network device group;
    a transmitter, configured to send a configuration complete message to the access network device of the LTE network, wherein the configuration complete message notifies the access network device of the LTE network that a second connection is successfully set up, and the second connection is a connection set up between the UE and the access network device of the LTE network through the first access network device; and wherein
    the processor is further configured to determine to switch the second connection from the first access network device to a second access network device in the access network device group;
    the transmitter is further configured to send a connection hang-up indication to the access network device of the LTE network, and the connection hang-up indication instructs the access network device of the LTE network to stop sending downlink data to the first access network device;

the processor is further configured to access the second access network device based on configuration information of the second access network device; and the transmitter is further configured to send a connection change indication to the access network device of the LTE network, wherein the connection change indication instructs the access network device of the LTE network to switch the second connection from the first access network device to the second access network device.

12. The UE according to claim 11, wherein the transmitter is further configured to send a candidate access network device group to the access network device of the LTE network, wherein the candidate access network device group comprises at least two candidate access network devices of the next generation network that are determined by the UE.

13. The UE according to claim 11, wherein the transmitter is configured to send the configuration complete message to the access network device of the LTE network through the first access network device, and the configuration complete message comprises an identifier of the access network device of the LTE network and an identifier of the UE in the next generation network.

14. The UE according to claim 11, wherein the transmitter is configured to send the configuration complete message to the access network device of the LTE network directly, and the configuration complete message carries an identifier of the first access network device and an identifier of the UE in the next generation network.

* * * * *